ID

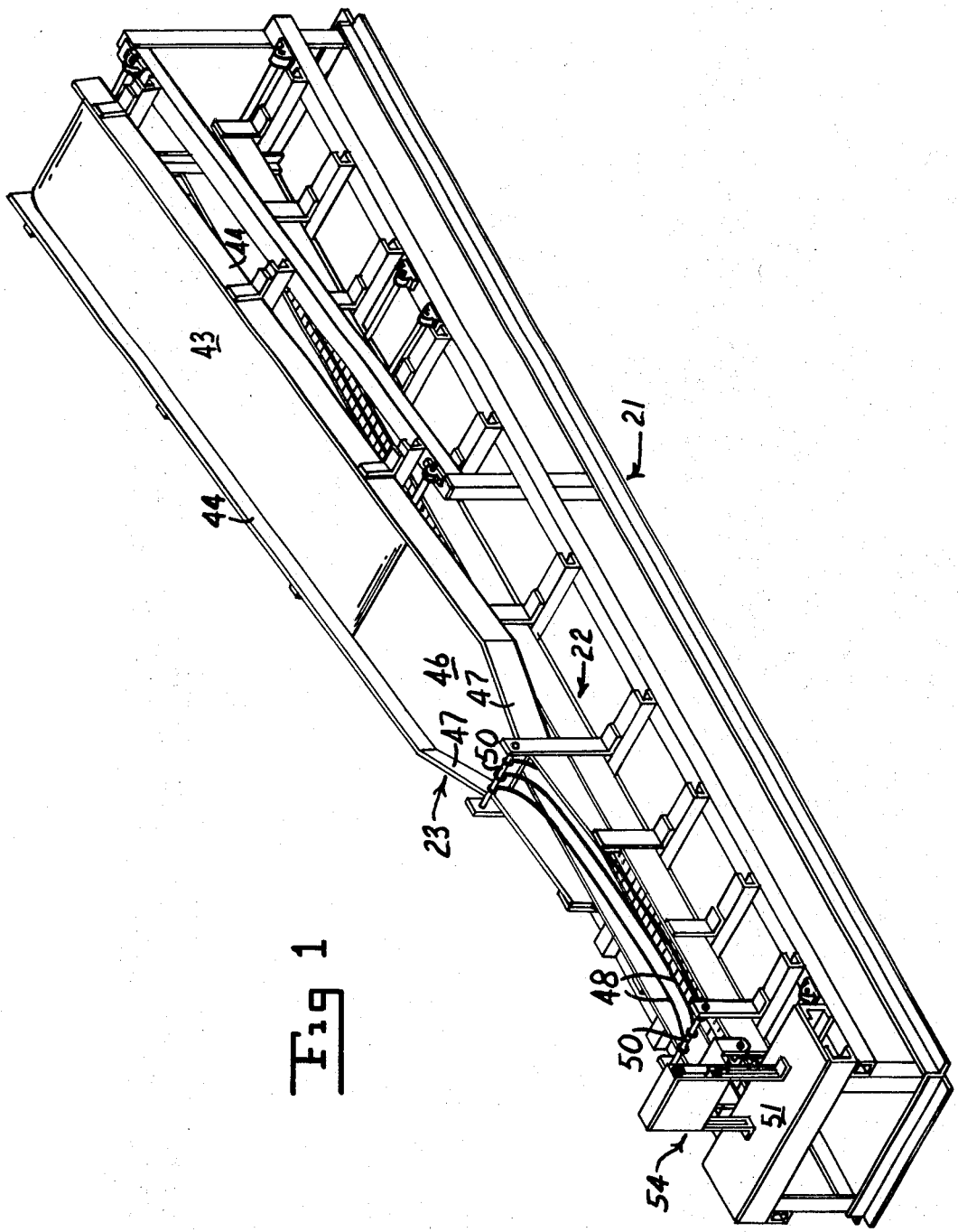

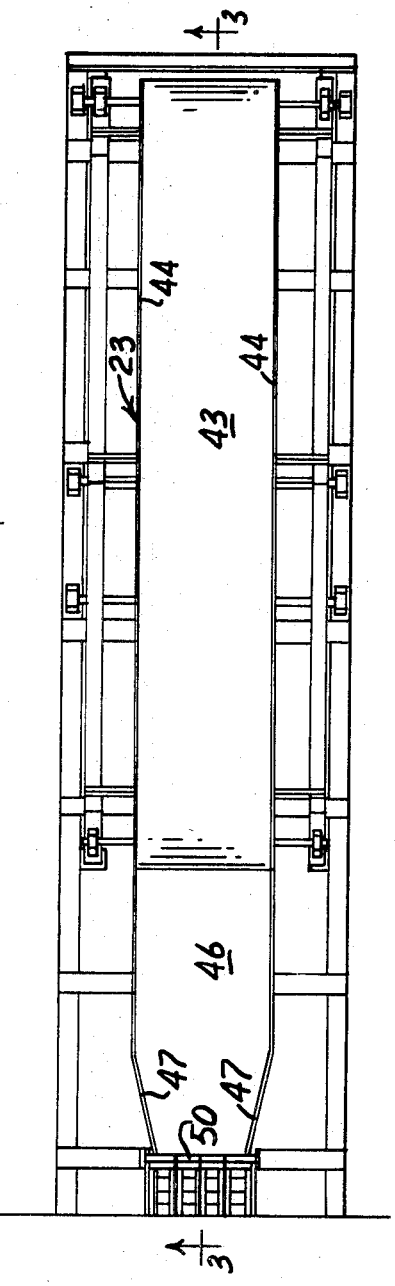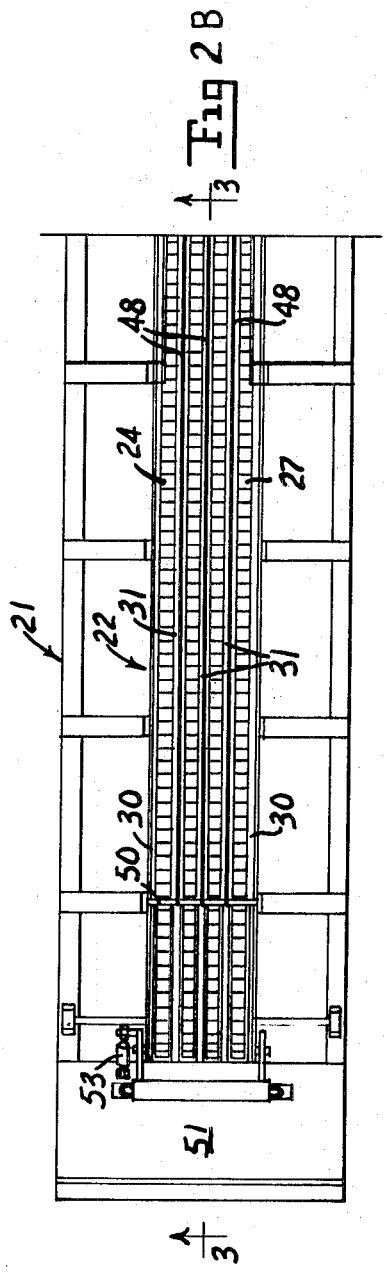

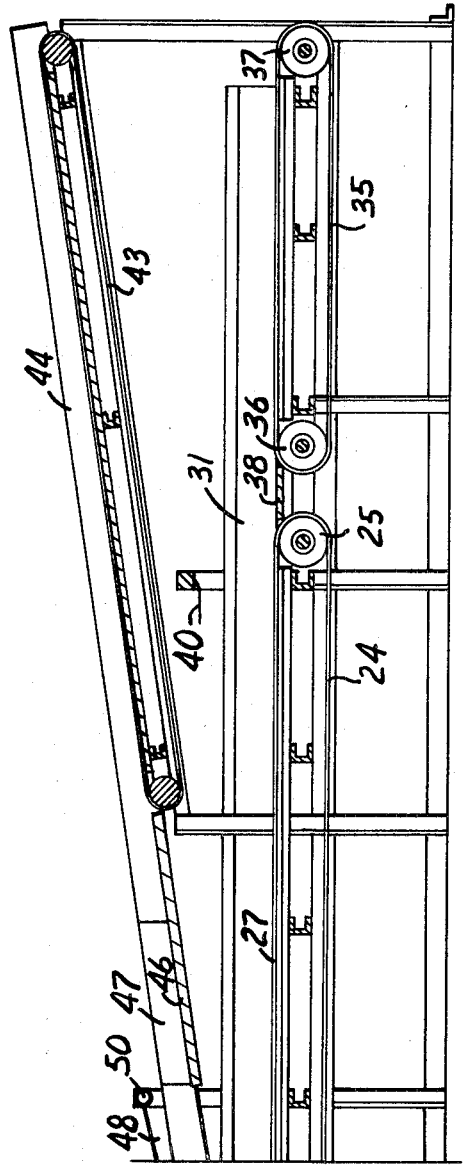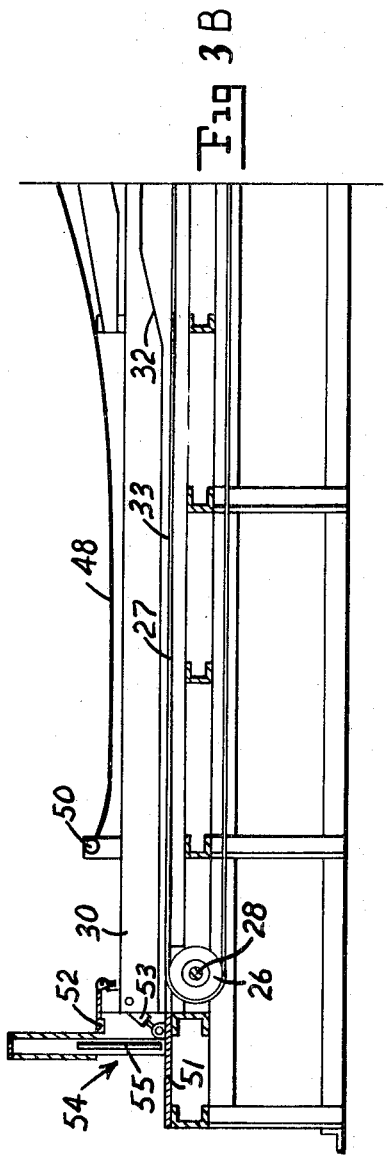

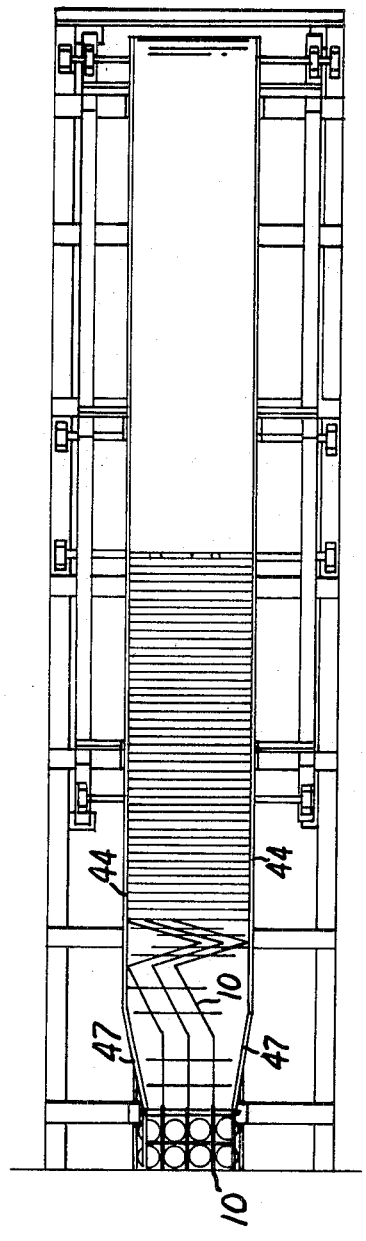
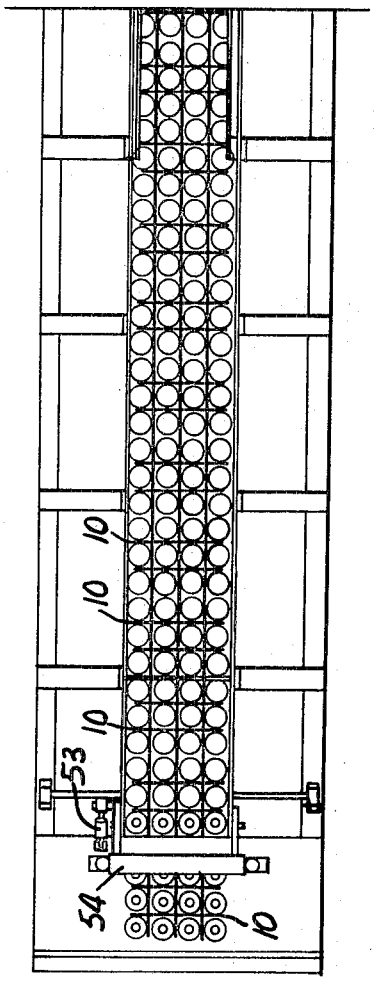

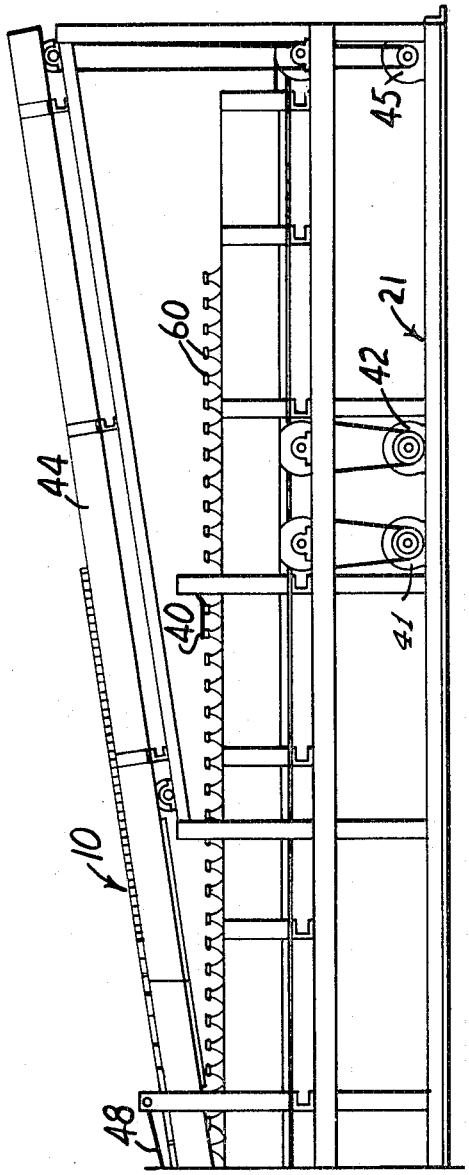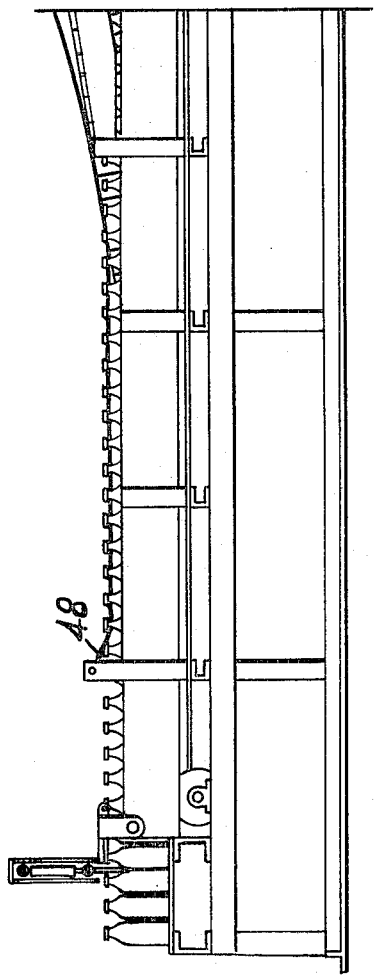

United States Patent Office 3,541,759
Patented Nov. 24, 1970

3,541,759
APPARATUS FOR PLACING PARTITIONS BETWEEN GROUP ARTICLES
Reinhold A. Pearson, % R. A. Pearson Company,
E. 304 2nd Ave., Spokane, Wash. 99202
Filed July 18, 1968, Ser. No. 745,821
Int. Cl. B65b 35/54
U.S. Cl. 53—157                                  9 Claims

ABSTRACT OF THE DISCLOSURE

An apparatus and method for placing initially collapsed partition units which are foldably joined to one another between grouped rows of articles, such as containers, bottles or cans. A continuous group of articles is collected in rows on a moving conveyor and a continuous string of foldably joined partitions is expanded and their perpendicular walls are placed between the articles. The partition and article unit corresponding to a carton load requirement is severed from the continuous structure prior to actual filling of a carton.

BACKGROUND OF THE INVENTION

The basic partition unit with which the present apparatus and method is concerned is developed from conventional partition structures which include a plurality of partition walls interlocked in a rectangular grid. Such partition walls are spaced center to center a distance adequate to provide effective separation between articles such as containers, principally glass jars and bottles. Under present practice, such partitions are constructed in single carton units, and are expanded and inserted into the carton prior to the carton being filled. This practice has in most instances necessitated the use of top loading equipment to fill the carton, requiring that the bottle or jars be dropped or lowered into the carton. The danger of breaking bottles or jars during placement of them into a carton being loaded from the top has prohibited the use of such mechanical loading equipment in industries where the material in a breakable container is particularly expensive.

The present disclosure is adapted for end loading of cartons, since the articles or containers and partitions are integrated into a unit assembly prior to loading of the carton. The articles or containers, with the partition walls interspersed between them, can be readily end-loaded, or a carton can be placed over the unit assembly. The end-loading of bottles with a partition unit between them is discussed in a patent to Norwood 2,961,811, which apparently places the individual partition unit over the bottles by an unspecified manner, probably manual effort. Another patent along this line is the patent to Hickin 2,968,898, which discloses an apparatus for assembling partitions between bottles, the partitions being constructed as they are placed between the articles.

In the present structure, the collapsed partition units are foldably joined in an endless manner, permitting usage of conventional partition manufacturing techniques and minimizing the storage volume required prior to use of the partition. The partitions are then expanded by being pulled from the storage area and the partition walls are gradually placed between waiting rows of articles such as bottles, the partitions being pulled along by the movement of the bottles between which they are engaged. The individual partition units are finally severed from one another after proper placement between the containers or articles.

SUMMARY OF THE INVENTION

The apparatus basically comprises a conveyor for grouping upright articles or containers in aligned adjacent rows, a partition storage structure, and partition delivery means for guiding the partition walls of foldably joined partition units between the rows of articles or containers. Means are provided for insuring proper expansion of each partition unit during its transition between the storage structure and the delivery mechanism.

The present method basically comprises the placement of the walls of the continuous partition structure between adjacent articles arranged in rows extending along and moving in a chosen direction, and the subsequent severing of the partition structure at preselected intervals along this direction. The severed units correspond to the carton dimensions within which the articles are to be packed.

A first object of the invention is to eliminate the manual handling of individual partition assemblies in a carton filling operation. By providing a continuous partition structure, the present apparatus automatically insures proper partition placement along prearranged article rows. This lends itself to a continuous method of partition application and eliminates the many difficulties encountered when handling individual partitions according to present practice.

Another object of the invention is to provide a partition placement apparatus having a minimum of moving parts or complicated mechanisms. The normally flimsy partitions are rendered much more manageable in a continuous string and the structure involved requires no reciprocating machinery for partition handling or article movement.

Another object is to provide a method of partition placement compatible with end loading of cartons. By placing the partition walls between the articles prior to loading, a complete load unit is achieved which can be directly inserted through the end of a tubular carton. By making end loading possible, the cost savings of end loaded cartons are made available to a wide range of industry where partitions are required within a carton.

DESCRIPTION OF THE DRAWINGS

FIG. 1 is a perspective view of the partition placement apparatus in an empty condition;

FIG. 2 is a top view of the empty apparatus, being constructed from FIGS. 2A and 2B;

FIG. 3 is a sectional view taken along line 3—3 in FIG. 2, FIGS. 3A and 3B corresponding respectively to FIGS. 2A and 2B;

FIG. 4 is a top view of the operating apparatus, FIGS. 4A and 4B corresponding respectively to FIGS. 2A and 2B;

FIG. 5 is a side elevation of the operating apparatus, FIGS. 5A and 5B corresponding respectively to FIGS. 4A and 4B;

PREFERRED EMBODIMENT OF THE INVENTION

Figure 6:
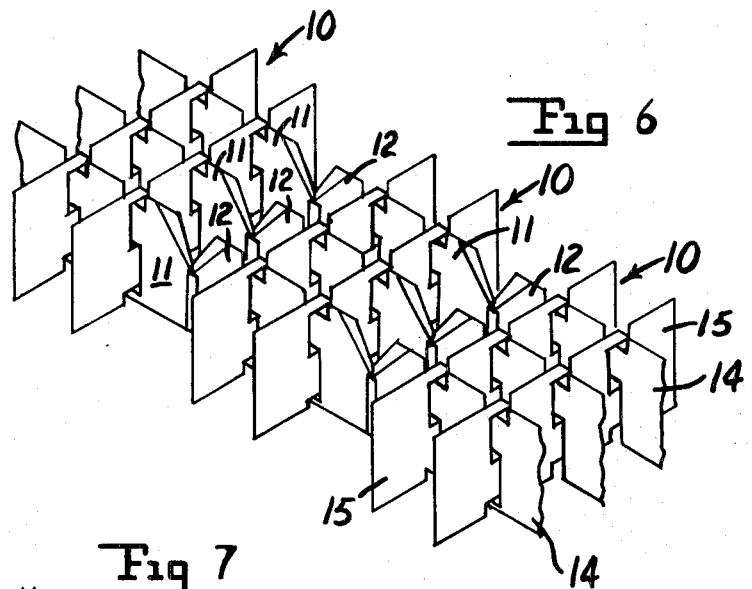
FIG. 6 is a fragmentary perspective view of the partition assembly.
Figure 7:
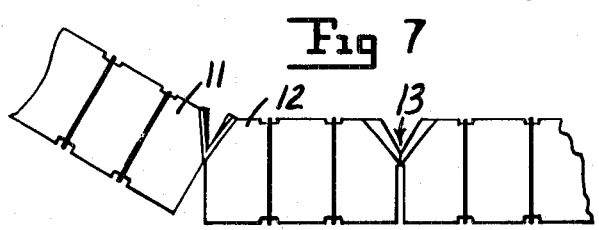
FIG. 7 is a side elevation view of the assembly in FIG. 6, illustrating the flexibility of the foldably joined partition units.
Figure 8:
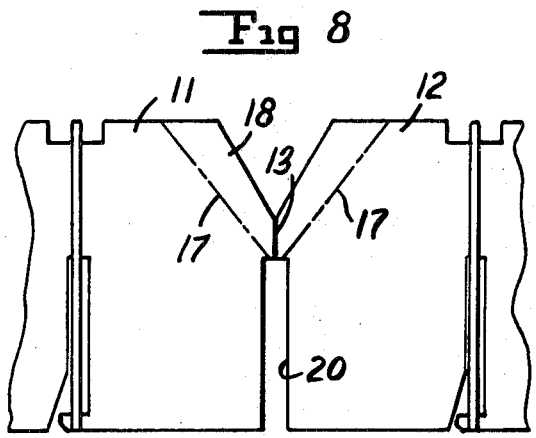
FIG. 8 is an enlarged fragmentary elevation looking toward the area joining adjacent partition units.

As a prelude to the comprehension of the present method and apparatus, it is first necessary to understand the structure of the novel partition assembly utilized herein for preparing bottles, jars or other articles for insertion into a carton. The essential elements of the partition assembly are illustrated in FIGS. 6, 7 and 8. These views show only a portion of the assembly, it being understood that it extends continuously in an endless line of similarly joined units. As additional partitions must be supplied into the apparatus, they are foldably connected to the preceding units by use of tape or adhesive to continue an endless supply of partitions. However, since the partition units are each joined to one another in a similar fashion, the structural example shown by the three units illustrated in FIGS. 6 and 7 is believed to suffice in permitting the understanding of the assembly.

Figure 9:
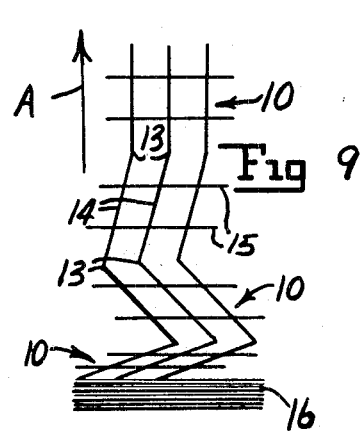
FIG. 9 is a line view illustrating the manner by which the partition units are pulled from a storage stack.

The partition assembly actually comprises a series of individual partition units 10 which are foldably joined to one another by front and rear tabs 11 and 12. While the designations "front" and "rear" are arbitrary, they are used herein in relation to the direction of movement of the partition units 10, the chosen direction of movement in FIGS. 6, 7 and 8 being from left to right. It is indicated in FIG. 9 by the arrow A. The tabs 11 and 12 of longitudinally adjacent partition units 10 are integrally joined to one another along an upright score line 13. Tabs 11 and 12 are longitudinal extensions of parallel spaced longitudinal partition walls 14 which are interlocked with transverse partition walls 15 to form the partition units 10.

The walls 14 and 15 in each partition unit 10 present a rectangular grid having open spaces adequate to permit the insertion of the desired articles or containers between them. The manner by which the partition walls 14 and 15 are interlocked is subject to variance and any conventional type of interlocking design can be utilized in conjunction with the present structure and method. The partition units 10 are conventionally collapsible to a condition wherein the walls 14 and 15 rest against one another and are expandable to the rectangular condition shown in FIG. 6. Adjacent partition units 10 are foldably connected in alternate directions along the longitudinal line of partition units, as can be seen in FIG. 9 which illustrates the partition units 10 being pulled in an upward direction from a storage stack 16. The direction of movement in FIG. 9 is designated by arrow A.

While not always essential, a preferred form of the partition includes provision for limited bending movement in the planes of partition walls 14 between adjacent partition units 10. Since the expanded partition units are rather rigid in this direction, special provision for bending is required if the bend is to be reasonably abrupt. As shown in FIGS. 7 and 8, this is provided by scoring tabs 11 and 12 along V-shaped lines 17 which converge toward the base of the upright score line 13. The lines 17 are scored from the sides of tabs 11, 12 opposite to the scoring of line 13. A bending force applied to the adjacent partition units will permit the lines 13 and 17 to bend (FIG. 7) and allow the partition units 10 to pivot relative to one another.

As shown, the upright score line 13 is rather short in relation to the height of the partition walls 14, 15. It extends between the base of a V-shaped recess 18 formed at the upper edges of tabs 11 and 12, which leads toward fold line 13 as its apex, and an upwardly open slot 20 leading upwardly from the lower edges of tabs 11, 12. The lines 13 and 17 could extend the full height, but the shortened nature of line 13 is desirable in order to facilitate the severing of tabs 11 and 12 along line 13 during use of the partition assembly.

In the present method, the partition units 10 are fed and expanded longitudinally from a stacked continuous supply and gradually placed over containers or articles moving longitudinally in prearranged longitudinal and transverse rows. The partition units 10 are urged downwardly in continuous alignment between the containers or articles and are pulled longitudinally by their engagement between such containers or articles. After proper insertion of the partition walls between the longitudinal transverse rows, the tabs 11 and 12 between adjacent partition units 10 are severed vertically to complete a separate carton unit for delivery into a carton.

In FIGS. 1 through 5 are shown the general features of an apparatus for carrying out this method of partition handling. The apparatus is mounted on a fixed supporting framework 21. It basically comprises an article conveyor assembly 22 and a partition storage and delivery assembly 23. The conveyor assembly 22 extends longitudinally along the length of framework 21. The partition storage and delivery assembly 23 extends longitudinally in the same general direction as the conveyor assembly 22. As shown in FIGS. 2–5, the various conveyors in both conveyor assembly 22 and partition conveyor assembly 23 move from right to left along their upper working flights, so that the bottles and partitions move generally in the same longitudinal direction.

The conveyor assembly 22 is composed of conventional conveyor equipment. It comprises an intermittently movable set of conveyor chains 24 supported by sprockets 25, 26. Each chain 24 has a coplanar upper horizontal working flight 27 (FIG. 3). In the example shown, where four transverse rows of bottles are illustrated, there would be provided four chains 24 suitably spaced in side by side relationship to one another and powered as a unit by the sprockets 26, mounted on a common shaft 28. Suitable upright dividers 30 are mounted on framework 21 at the extreme sides of the chains 24, and intermittent dividers 31 are provided between the adjacent chains 24 to maintain the longitudinal rows of bottles in proper alignment. The dividers 31 are tapered downwardly as shown at 32, continuing forward as lowered extensions 33 reduced considerably in height. This reduction in divider height between the conveyor chains provides adequate clearance for reception of the partition units 10 fed onto the bottles.

As seen in FIG. 3, feed conveyor chains 35 are provided on framework 21 rearward of chains 24 and in longitudinal alignment therewith. The chains 35 are separated by longitudinal extensions of dividers 30, 31 and are continuously powered by means of sprockets 36, 37 on common supporting transverse shafts. The chains 35 can be extended longitudinally any desired length. They constitute a constantly moving supply conveyor for the articles being fed to the intermittently movable chains 24. The area between chains 35 and 24 is bridged by a coplanar table 38 over which the articles are free to slide when pushed from behind by incoming articles on chains 35.

The purpose of the combination of continuously moving chains 35 and intermittently movable chains 24 is to insure a complete supply of adjacent articles or bottles along the chains 24, where the partitions are placed between them. For this reason a suitable detection apparatus, such as a series of limit switches placed individually above each chain 24 and provided with detection levers 40 (FIGS. 3, 5) is provided across the working flights 27 for chains 24. The levers 40 detect the continuing presence of bottles beneath them, and the switches controlled thereby include a conventional time delay device conditioned so that if bottles are not detected over a chosen period of time, the chains 24 will be stopped until this condition has been corrected. The time delay controls for both stopping and starting the motor 41 that powers the chains 24 is preferably adjusted to maintain a full supply of bottles along the portion of bottles conveyor assembly 22 that intersects the partition storage and delivery assembly 23. As shown in FIG. 5, this can be regulated so as to back up the rows of bottles along chains 35 to insure the maintenance of such a supply in a high capacity system. The chains 35 are powered independently by a constantly operating motor 42.

The partition storage and delivery assembly 23 is located directly above and forwardly intersects the conveyor assembly 22. The collapsed partition assemblies are maintained in storage along an inclined endless belt 43 between raised side walls 44 which retain the partitions in the required transverse alignment. The belt 43 is suitably supported on the framework 21 and is intermittently powered by a motor 45 (FIG. 5). The upper working flight of belt 43 leads forwardly to a coplanar table surface 46 that progressively diminishes in width to a width equal to the expanded width of the partition units 10. The partition units 10 are expanded on the smooth table surface 46 as they are pulled from the stack, the side edges of the partition units 10 being urged to an expanded condition by the converging forward ends 47 of walls 44.

The intermittently movable belt 43 is used to control the position of the bulky collapsed partitions that remain in storage so that the expansion of the partition units 10 is effectively maintained along the area of the table surface 46. The movement of the remaining collapsed partition units in a forward direction due to intermittent movement of belt 43 also makes possible the placement of subsequent partition units on the assembly in a continuous fashion, the forward ends of the added partition units being joined to the rear ends of those already in place by means such as pressure sensitive tape. This permits the user of the machine to maintain and endless supply of partitions.

Extending forwardly from the table surface 46 are longitudinal flexible members 48, each spaced above the plane of the working flight of belt 43 and table surface 46 a distance substantially equal to the height of the partition units 10. The members 48 are supported at their longitudinal ends by transverse supports 50 on the framework 21. Their purpose is to urge the partitions 10 downwardly between the articles or containers beneath them.

At the forward end of the chains 24 is a support table 51 on which the articles are pushed from the working flights 27. A pad 52 is transversely pivoted on framework 21 by pneumatic cylinder 53 at a position above table 51, the pad 52 being selectively engageable with the next row of articles or containers following a complete partition unit 10 on table 51 serving to hold them immobile and thereby selectively arrest forward movement of the articles and partitions along the apparatus.

Forwardly adjacent to pad 52 is a transverse knife mechanism shown generally at 54, comprising a blade 55 slidably mounted by upright guides 56 and powered by vertical pneumatic cylinder assemblies 57. Downward movement of the blade 55 is used to sever adjacent partition units 10 by cutting along the previously discussed upright fold 13. After such cutting action, the articles and partitions are then moved to other machinery (not shown) for placement into a carton as an individual unit.

The operation of this apparatus is believed to be generally apparent from the above description. As can be seen in FIGS. 4 and 5, it is particularly advantageous in placing partition walls between bottles. In FIGS. 4 and 5, the bottles 60 are shown aligned along the bottle conveyor assembly 22 in both longitudinal and transverse rows. The number of longitudinal rows must correspond to one of the dimensional requirements of the carton within which the bottles are to be packed. The longitudinal length of each partition unit 10 must correspond to the remaining dimensional requirements for the carton, so that the partition unit 10, when severed, will separate a group of prearranged bottles 60 which will fill a single carton or carton space.

A continuous supply of collapsed units 10 foldably joined to one another is maintained on the upper surface of belt 43, and is intermittently moved in a forward direction to maintain the bulk of the supply adjacent to the table surface 46 on which they are expanded. The partition units 10 are automatically pulled from the storage stack by the movement of the bottles 60 engaged by them where the paths of the partitions and bottles converge.

The aligned rows of bottles on the flights 27 are maintained in a constantly filled condition by the stoppage of chains 24 when necessary to await additional bottles. Vibrators or other devices to assist in slightly separating the bottles during insertion of partition walls between them can be utilized. Likewise, other types of severing devices for the individual partition units and other devices for holding back the flow of bottles and partitions during such severance can be used if desired or required by a particular installation.

The reduced height of dividers 33 along the forward portions of chains 24 permits the partition units 10 to locate between the bottles 60 so that the upper edges of the partition units 10 are beneath the top elevation of bottles 60. It is not necessary that the partitions be permitted to ride completely downward between the individual bottles, so long as the partition walls are inserted between adjacent bottles. In this way, the rigid guides 33 can be used along a greater length of the apparatus to insure that the bottles remain in their desired row configurations.

After being severed, the partition units 10 and the bottles contained thereby can be readily inserted into a carton that is end-loaded by pushing the unit transversely of the conveyor assembly 22. As an alternative, the bottles can be placed into a top-loaded carton by placing the carton over the partition and bottles, either in a stationary operation or along a moving conveyor.

A cost saving is available with this method and apparatus that cannot be utilized when the partitions are placed within a carton individually and then loaded with articles or containers. Due to the fact that the bottles and partitions are handled as a unit when the carton is being loaded, the transverse width of the partition units 10 along the partition storage and delivery assembly 23 need only be slightly greater than the center to center distance of the bottles across the bottle conveyor assembly 22. It is not necessary that each partition extend across the full transverse width of the bottle rows, so long as the transverse walls extend across the width wherein the bottles contact one another. This permits a saving in partition material not available in a conventional single partition which is located within a carton by full width partition walls.

Obviously many modifications could be made in the apparatus disclosed which would still be capable of operating under the present method. The method is also open to modification to accommodate particular articles or containers or partition devices. Therefore, the foregoing description is submitted by way of example only, and the invention disclosed is set out in the claims which follow.

Having thus described my invention, I claim:

1. An apparatus for placing partitions between grouped articles wherein the partitions are in the form of a plurality of collapsible and expandable partition units foldably joined to one another, each partition unit including a plurality of pivotally interconnecting partition walls, the partition units in expanded grid configuration having parallel transverse partition walls and parallel longitudinal partition walls, each partition unit corresponding physically to predetermined carton and article size requirements, comprising:
   conveyor means for grouping articles in aligned adjacent rows;
   partition storage means;
   partition delivery means for placing the continuous grid configuration of transverse and longitudinal partition walls between the rows of articles grouped by said conveyor means;
   and partition expanding means interposed between said partition storage means and said partition delivery means for removing foldably joined partition units from said partition storage means, expanding the partition units to a continuous grid configuration and directing the partition units to said partition delivery means.

2. An apparatus as set out in claim 1 wherein said partition delivery means comprises longitudinal guides which urge the expanded partitions downwardly between the grouped articles on said conveyor means in a continuous fashion.

3. An apparatus as set out in claim 1 further comprising means for severing said partition units from one another after placement thereof between the rows of articles.

4. An apparatus as set out in claim 3 further comprising:
holding means for interrupting the movement of the partition units and articles during severing of the partition units from one another.

5. An apparatus for placing partition units between grouped containers wherein the partitions are in the form of a plurality of collapsible and expandable partition units foldably joined to one another, each partition unit including a plurality of pivotally interconnecting partition walls, the partition units in expanded grid configuration having parallel transverse partition walls and parallel longitudinal partition walls, each partition unit corresponding physically to predetermined carton and article size requirements, comprising:
conveyor means for grouping upright containers in aligned longitudinal and transverse rows corresponding to the carton requirements and for moving said rows longitudinally;
partition storage means;
partition delivery means for directing the foldably joined partition units, when expanded to a continuous grid configuration, along a longitudinal path converging from above over the rows of containers and for placing the respective transverse and longitudinal partition walls between the containers;
and partition expanding means interposed between said partition storage means and said partition delivery means for removing foldably joined partition units from said partition storage means, expanding the partition units to a continuous grid configuration, and directing the partition units to said partition delivery means.

6. An apparatus as set out in claim 5 wherein said partition expanding means comprises a supporting surface for the partitions along which the partitions are permitted to foldably expand as they are pulled from a collapsed storage stack by engagement of the partitions with the containers on said conveyor means.

7. An apparatus as set out in claim 5 further comprising means transverse to said conveyor means for severing individual partition units from one another after placement thereof between the containers.

8. An apparatus for placing partition units between grouped containers wherein the partitions are in the form of a plurality of collapsible and expandable partition units foldably joined to one another, each partition unit including a plurality of pivotally interconnecting partition walls, the partition units in expanded grid configuration having parallel transverse partition walls and parallel longitudinal partition walls, each partition unit corresponding physically to predetermined carton and article size requirements, comprising:
a supporting framework;
a horizontal container conveyor assembly on said framework including container guide and support members arranged thereon to align containers in longitudinal and transverse rows relative to said framework, said support members having longitudinally movable container conveying surfaces;
power means on said framework operatively connected to said container conveyor assembly for causing the container conveying surfaces thereof to move in one longitudinal direction relative to said framework;
a storage surface on said framework aligned above said container conveyor assembly for positioning a stack of foldably joined collapsed partition units on edge facing in the general direction of movement of said container conveying surfaces;
and partition guide means on said framework for removing foldably joined collapsed partition units from the storage surface, expanding the partition units to a continuous grid configuration and directing the respective transverse and longitudinal partition walls of the expanded partition units between rows of containers aligned on the container conveying surfaces of said horizontal container conveyor assembly.

9. An apparatus as set out in claim 8 wherein said partition guide means comprises fixed guides on said framework converging toward said container conveyor assembly in the direction of longitudinal movement of said container conveying surfaces.

References Cited

UNITED STATES PATENTS 2,615,289  10/1952  Hicken _____ 53—48 XR
2,962,943  12/1960  Mumper _____ 93—37

H. A. KILBY, JR., Primary Examiner